US007377492B2

(12) United States Patent
Vrana et al.

(10) Patent No.: US 7,377,492 B2
(45) Date of Patent: May 27, 2008

(54) HYDRAULIC LIQUID PUMPING SYSTEM

(75) Inventors: Julius S. Vrana, Wexford, PA (US); William W. Timmons, Pittsburgh, PA (US); David J. Walters, Ligonier, PA (US)

(73) Assignee: A Better Power, LLC, Ligonier, PA (US)

( * ) Notice: Subject to any disclaimer, the term of this patent is extended or adjusted under 35 U.S.C. 154(b) by 139 days.

(21) Appl. No.: 11/201,535

(22) Filed: Aug. 11, 2005

(65) Prior Publication Data

US 2006/0032374 A1  Feb. 16, 2006

Related U.S. Application Data

(60) Provisional application No. 60/600,500, filed on Aug. 11, 2004.

(51) Int. Cl.
*B01F 3/04* (2006.01)
(52) U.S. Cl. .................... 261/29; 261/35; 261/36.1; 261/76; 261/DIG. 75; 60/398; 60/415
(58) Field of Classification Search ............... 261/29, 261/35, 36.1, 76, 77, DIG. 75; 60/325, 398, 60/410, 415
See application file for complete search history.

(56) References Cited

U.S. PATENT DOCUMENTS 323,325 A * 7/1885 Hambruch ................ 417/150

(Continued)

FOREIGN PATENT DOCUMENTS

CA  2340463  9/2002

(Continued)

OTHER PUBLICATIONS

J.A. Berghmans et al., "Performance Of A Hydraulic Air Compressor For Use In Compressed Air Energy Storage Power Systems", *Symposium On Fluids Engineering In Advanced Energy Conversion Systems—1978 ASME Winter Annual Meeting*, Dec. 10-15, 1978.

(Continued)

*Primary Examiner*—Scott Bushey
(74) *Attorney, Agent, or Firm*—The Webb Law Firm

(57) ABSTRACT

A system for concentrating gas, using the concentrated gas to pump liquid, and recycling the gas and liquid is disclosed. The system comprises a body of liquid, a down pipe in fluid communication with the body of liquid, a gas injection apparatus for introducing gas into the liquid that passes through the down pipe, a separator for separating compressed gas from the liquid, and a gas-liquid recycle loop. The down pipe and the gas injection apparatus are structured and arranged to compress the gas. The gas-liquid recycle loop comprises a compressed gas storage vessel containing the separated gas, a reservoir containing liquid separated from the compressed gas, and a gas-liquid pump. The gas-liquid pump has a gas inlet in communication with the gas storage vessel, and a fluid inlet in communication with the reservoir. The gas-liquid pump is structured and arranged for pumping the liquid back to the body of liquid and delivering the gas to the gas injection apparatus. A turbine in fluid communication with the liquid that passes through the down pipe can be optionally included. A second loop system comprising a second body of liquid, a second down pipe in fluid communication with the second body of liquid, and a second gas-liquid pump is also disclosed. The second gas-liquid pump comprises a second gas inlet in communication with a compressed gas storage area, a second liquid inlet in communication with the second liquid that passes through the second down pipe, the second gas liquid pump structured and arranged for pumping the second liquid to the second body of liquid. A second turbine in fluid communication with the liquid that passes through the second down pipe can optionally be included.

20 Claims, 6 Drawing Sheets

U.S. PATENT DOCUMENTS

| | | | |
|---|---|---|---|
| 543,410 A | 7/1895 | Taylor | |
| 893,222 A | 7/1908 | Bernstein | |
| 1,000,345 A | 8/1911 | Roed | |
| 1,005,911 A | 10/1911 | Wilbur | |
| 1,449,523 A | 3/1923 | McGinn | |
| 2,013,236 A | 9/1935 | Dell | |
| 2,077,482 A | 4/1937 | Jones et al. | |
| 2,861,737 A | 11/1958 | Bowen | |
| 3,840,216 A * | 10/1974 | Smith et al. | 261/29 |
| 3,976,575 A | 8/1976 | Sullins | |
| 4,042,510 A | 8/1977 | Sullins | |
| 4,110,980 A | 9/1978 | Foulke | |
| 4,180,980 A | 1/1980 | Marks et al. | |
| 4,265,599 A | 5/1981 | Morton | |
| 4,291,232 A | 9/1981 | Cardone et al. | |
| 4,698,516 A | 10/1987 | Thompson | |
| 4,767,938 A | 8/1988 | Bervig | |
| 4,803,016 A | 2/1989 | Binderman et al. | |
| 4,911,613 A | 3/1990 | Cox | |
| 4,965,022 A * | 10/1990 | Litz | 261/36.1 |
| 4,971,685 A | 11/1990 | Stanley et al. | |
| 5,035,842 A | 7/1991 | Mohn | |
| 5,099,648 A | 3/1992 | Angle | |
| 5,135,684 A | 8/1992 | Mohn et al. | |
| 5,254,292 A | 10/1993 | Gabryelczyk et al. | |
| 5,340,283 A | 8/1994 | Nagata | |
| 5,377,485 A | 1/1995 | Bellamy | |
| 5,461,858 A | 10/1995 | Johnson | |
| 5,551,237 A | 9/1996 | Johnson | |
| 5,897,295 A | 4/1999 | Rogers et al. | |
| 6,272,839 B1 | 8/2001 | Karl | |
| 6,510,687 B1 | 1/2003 | Zaslavsky et al. | |
| 6,546,723 B1 | 4/2003 | Watten et al. | |
| 6,574,957 B2 | 6/2003 | Brumfield | |
| 6,638,024 B1 | 10/2003 | Hancock | |
| 6,647,717 B2 | 11/2003 | Zaslavsky et al. | |
| 6,420,794 B1 | 7/2005 | Cao | |
| 6,998,056 B2 * | 2/2006 | Scherzinger et al. | 210/703 |
| 2003/0102676 A1 | 6/2003 | Rembert | |
| 2003/0127860 A1 | 7/2003 | Baron | |
| 2003/0167760 A1 | 9/2003 | Jackson | |
| 2004/0066043 A1 | 4/2004 | Maiwald et al. | |
| 2004/0088971 A1 * | 5/2004 | Mishnayot | 60/398 |

FOREIGN PATENT DOCUMENTS

| | | |
|---|---|---|
| DE | 3842851 | 12/1988 |
| FR | 2372329 | 6/1978 |
| WO | WO 91/09224 | 6/1991 |
| WO | WO 92/19864 | 11/1992 |
| WO | WO 99/66199 | 12/1999 |

OTHER PUBLICATIONS

L. F. Schultz, "Hydraulic Air Compressors", *United States Dept. of Interior Information Circular 7683*, May 1954.

W. Rice, "The Hydraulic Air Compressor As Part Of An Ultra Low-Head Hydropower System", *Report No. DOE/ID/12198-13, Unclassified Document Prepared For U.S. Dept. Of Energy—Idaho Falls, Idaho*, May 1982.

"The Great Pyramid As Water Pump" Pharaoh's Pump Foundation, http://www.thepump.org/art6completeGPpump.html Sep. 1, 2005.

"Nature Produces Compressed Air—Ragged Chute Air Plant", http://www.cobalt.ca/ragged_chutes.htm Sep. 2, 2005.

Langborne, P.L., "Hydraulic Air Compression, Old Invention-New Energy Source", National Engineering Laboratory, East Kilbride, Glasgow.

Schulze, Leroy E., "Hydraulic Air Compressors", Information Circular 7683, United States Department Of The Interior, May 1954.

* cited by examiner

HYDRAULIC LIQUID PUMPING SYSTEM

CROSS REFERENCE TO RELATED APPLICATIONS

This application claims the benefit of U.S. Provisional Application No. 60/600,500 filed Aug. 11, 2004, which is incorporated herein by reference.

FIELD OF THE INVENTION

The present invention relates to a liquid pumping system, and more particularly to a liquid pumping system that utilizes liquid to compress a gas and uses a part of the compressed gas to recycle the liquid within the system.

BACKGROUND INFORMATION

Many liquid pumping systems have means for entrapping and compressing air in order to generate rotational mechanical energy. However, most traditional designs required a naturally occurring steep vertical fall that is fed by a stream of water, such as a waterfall, in order to be operational. This required that the water source must be located on ground having a high altitude and the compressed gas accumulator must be located on ground having a lower altitude. In conventional systems, water expelled from the system is returned to the moving water source at a return location that is different from the location that feeds the system, i.e., the water return point has a lower altitude than the point where water is taken from the stream to fill the conventional system. These geographic constraints drastically limited the areas that many hydraulic air compressor systems could be located. Furthermore, water passing through a traditional liquid pumping system could be used only once, thereby requiring a continuous renewable resource of liquid to drive the system. Accordingly, a need remains for a liquid pumping system that uses compressed gas to drive a mechanical device that does not require a continuous renewable water source. The present invention has been developed in view of the foregoing.

SUMMARY OF THE INVENTION

An aspect of the present invention is to provide a system comprising a body of liquid, a down pipe in fluid communication with the body of liquid, a gas injection apparatus for introducing gas into the liquid that passes through the down pipe, wherein the down pipe and the gas injection apparatus are structured and arranged to compress the gas, a separator for separating compressed gas from the liquid, and a gas-liquid recycle loop. The gas-liquid recycle loop comprises a compressed gas storage vessel containing the separated gas, a reservoir containing liquid separated from the compressed gas, and a gas-liquid pump having a gas inlet in communication with the gas storage vessel, and a fluid inlet in communication with the reservoir, the gas-liquid pump structured and arranged for pumping the liquid to the body of liquid and delivering the gas to the gas injection apparatus.

Another aspect of the present invention is to provide a system comprising a body of liquid, a down pipe in fluid communication with the body of liquid, means for introducing gas into the liquid, the down pipe and the means for introducing gas into the liquid structured and arranged to compress the gas, means for separating the compressed gas from the liquid, means for recycling the separated gas back to the means for introducing gas into the liquid, and means for recycling the liquid separated from the compressed gas back to the body of liquid.

A further aspect of the present invention is to provide a method comprising the steps of providing a body of liquid, providing a down pipe in fluid communication with the body of liquid, introducing gas from a gas injection apparatus into the liquid that passes through the down pipe to produce a compressed gas, separating the compressed gas from the liquid, and recycling the separated gas and liquid. The step of recycling the separated gas and liquid comprising the steps of storing the compressed gas in a gas storage area, storing the liquid separated from the compressed gas in a reservoir, introducing the compressed gas from the gas storage area and the liquid from the reservoir into a gas-liquid pump, pumping the liquid to the body of liquid, and delivering the gas to the gas injection apparatus.

These and other aspects of the present invention will be more apparent from the following description.

DETAILED DESCRIPTION

Figure 1:
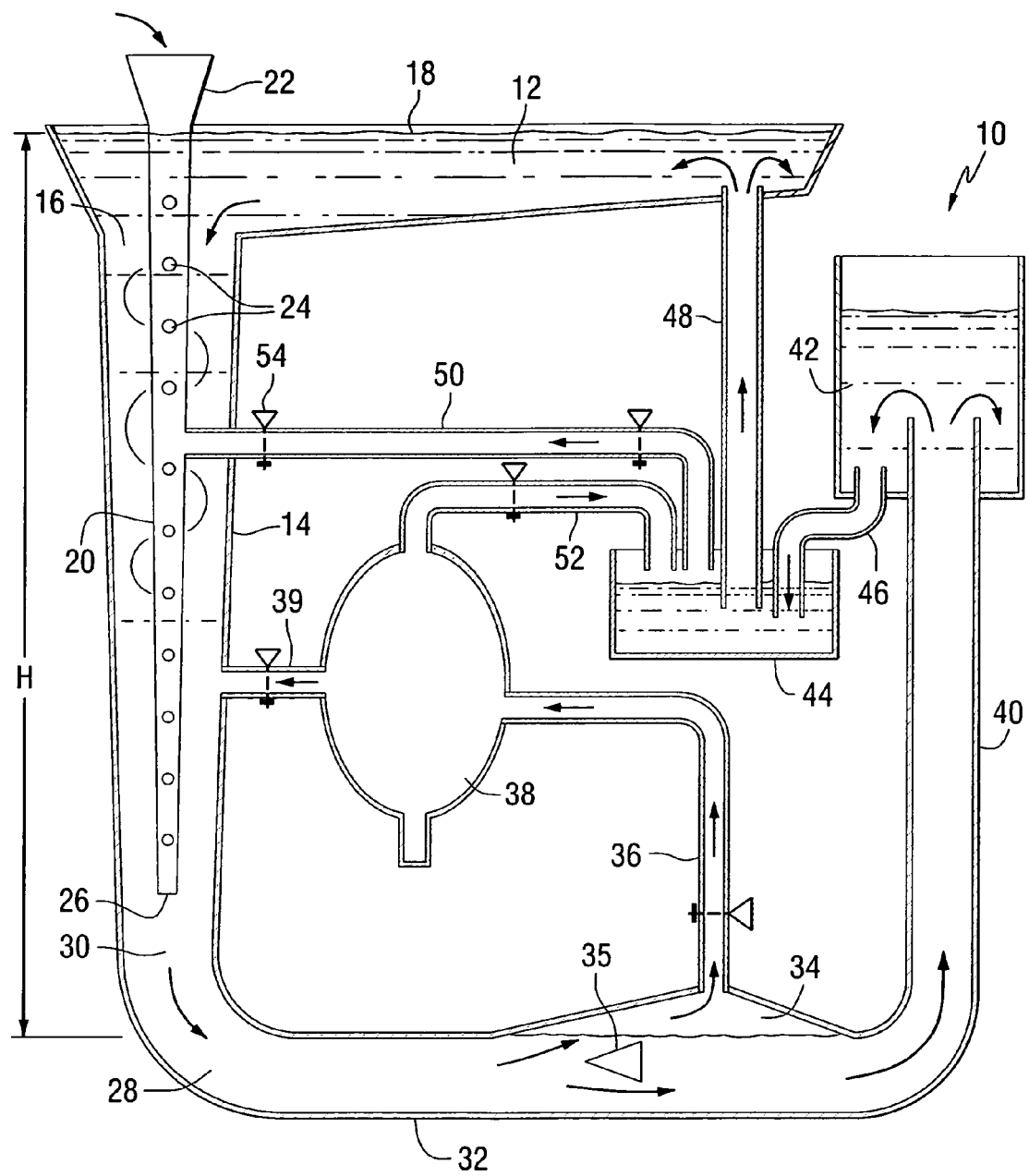
FIG. 1 is a schematic representation of a first loop gas-liquid pumping system in accordance with an embodiment of the present invention.

As shown in FIG. 1, a first loop system 10 of the present invention comprises a source liquid area 12. Source liquid area 12 can comprise a vessel suitable for housing a body of water, such as a holding tank, clay lined pond, reservoir and the like, or a region within a body of liquid, such as a river, stream, and the like. Source liquid area 12 can comprise any suitable liquid, such as water, and can have any desired volume, depending on the needs of the first loop system 10. In one embodiment, the first loop system 10 can be oriented substantially below the source liquid area 12, such as oriented underground, below a lake or body of open water.

A down pipe 14 structured to receive liquid from the source liquid area 12 can be positioned within the source liquid area 12. The down pipe 14 is substantially aligned in the vertical direction and can include a pipe opening 16 that is at least partially recessed below the surface of the liquid 18. The down pipe 14 can comprise any suitable piping material, such as plastics and/or metals that are corrosion resistant. The down pipe 14 can have any suitable height H, such as from about 8 feet to about 1,000 feet or more. In another embodiment, the down pipe 14 can have any suitable height H of from about 10 feet to more than about 2,000 feet. The down pipe 14 can have any suitable diameter, such as from about 2 inches to about 100 feet. In another embodiment, a down pipe 14 having a height H of about 350 feet can have a diameter of from about 8 feet to about 40 feet, depending on flow requirements within the system. In one embodiment, the down pipe 14 can be uniform in diameter or can have an inward taper at a lower vertical position of the down pipe 14. In one embodiment, the down pipe 14 can have an area at a lower vertical end position that is from about 10 percent to about 95 percent the area of the down pipe 14 at a higher vertical end position. In another embodiment, the down pipe 14 can have an area at a lower vertical end position that is from about 40 percent to about 60 percent the area at a higher vertical end position.

A gas injection apparatus, such as a gas entrainment tube 20, can be at least partially positioned within the down pipe 14. In one embodiment, the gas entrainment tube 20 is at least partially circumferentially disposed within the interior of the down pipe 14. The gas entrainment tube 20 can have a gas receiving port 22 that extends at least partially above the surface of the liquid 18. The gas receiving port 22 can receive air from the atmosphere, gas from a tank source, or gas blown in by a fan. Conventional gas directing means, such as fans, blowers, ducts, and the like can be used to direct gas into the gas receiving port 22. In one embodiment, the gas can be heated to a temperature exceeding the ambient temperature by any conventional heating means, such as burners, flame reactors and the like.

The gas entrainment tube 20 can comprise a plurality of gas access ports 24 extending through a sidewall of the gas entrainment tube 20. In one embodiment, the gas entrainment tube 20 can have a vertical height that extends substantially the entire vertical height of the down pipe 14. In another embodiment, the gas entrainment tube 20 can have a vertical height that extends from about 50 percent to about 80 percent the vertical height of the down pipe 14. The gas entrainment tube 20 can have any suitable dimensions such that the outer diameter of the gas entrainment tube 20 is smaller than the inner diameter of the down pipe 14. In one embodiment, the gas entrainment tube 20 can have an outer diameter that is about 50 percent the inner diameter of the down pipe 14. In another embodiment, the gas entrainment tube 20 can have at an inward taper corresponding to an inward taper of the down pipe 14.

The down pipe 14 and the gas entrainment tube 20 can be made from any suitable material sufficient to resist the compressive forces of the contained liquid and gas, such as metal and/or plastic. In one embodiment, the down pipe 14 and the gas entrainment tube 20 are made from a substantially corrosion-resistant material. As the amount of gas present in the down pipe 14 increases, the velocity of the liquid can be retarded by the upward movement of gas bubbles in the down pipe 14. Smaller bubbles of gas tend to provide less liquid velocity retardation within the down pipe 14. Accordingly, in one embodiment, means for introducing smaller bubbles of gas into the down pipe 14 can include small holes, having a diameter such as from less than 0.25 inches to about 3 inches, extending through the sidewalls of the gas entrainment tube 20, fine bubble meshes, and gas metering means for limiting the flow of gas into the gas entrainment tube 20 at any specified time.

In one embodiment, liquid from the source liquid area 12 is directed into the down pipe 14 and gas is simultaneously introduced into the gas entrainment tube 20. In another embodiment, liquid from the source liquid area 12 is directed into the down pipe 14 and gas is subsequently introduced into the gas entrainment tube 20. In one embodiment, gas contained within the gas entrainment tube 20 is directed through the gas access ports 24 and combines with the liquid traveling within the down pipe 14.

As the liquid travels vertically downward in the down pipe 14 and the gas is forced vertically downward in the gas entrainment tube 20 and out from the gas entrainment tube 20 into the down pipe 14 through gas access ports 24, the gas and liquid mix together to form a gas-liquid mixture. The down pipe 14 can be attached, in fluid-gaseous communication, to an angled pipe section 28 at the lower end 30 of the down pipe 14. The angled pipe section 28 can have an angle of from about 70° to about 100°. In another embodiment, the angled pipe section 28 can have an angle of about 90°. The angled pipe section 28 can comprise a single angled section or multiple angled sections that result in an angle of from about 70° to about 100°, such as about 90°. The use of multiple angled sections can reduce the wear on the piping joint connecting the angled pipe section 28 and the down pipe 14 by more evenly distributing the water pressure from the down pipe 14 across several angled sections, each having a smaller angle.

The angled pipe section 28 can be connected, in fluid-gaseous communication, to a bottom tube 32. In one embodiment, the bottom tube 32 is oriented substantially perpendicular to the orientation of the down pipe 14. The bottom tube 32 can comprise a pipe having a diameter that is substantially the same size as the diameter of the lower end of the down pipe 14. In another embodiment, the cross-sectional area of the bottom tube 32 is substantially equivalent to the difference in the cross-sectional area between the down pipe 14 and the gas entrainment tube 20. In one embodiment, the angled pipe section 28 can comprise a chamber that allows for the collection of gas from the gas-liquid mixture and allows liquid to flow through to a bottom tube 32.

Figure 2:
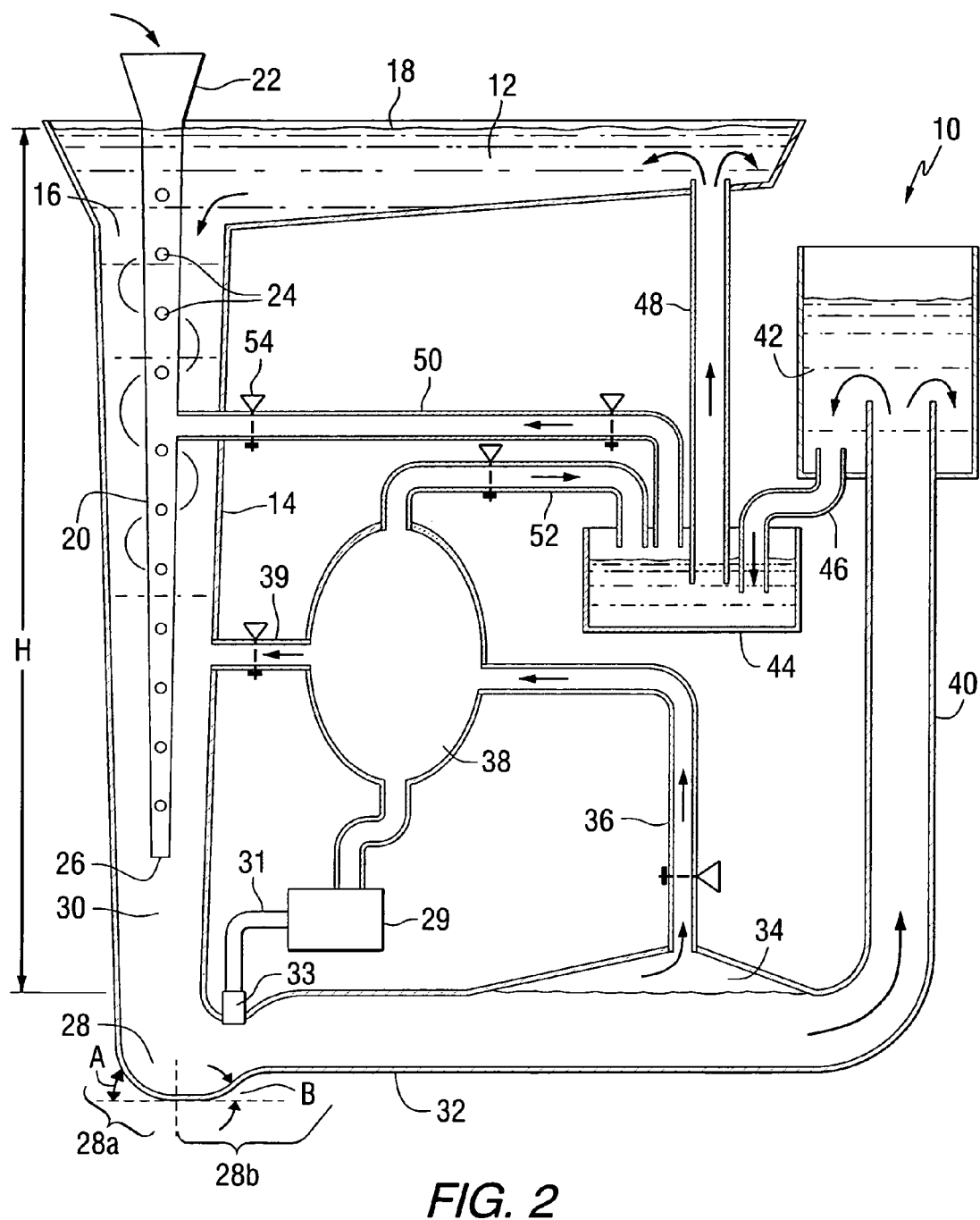
FIG. 2 is a schematic representation of a first loop gas-liquid pumping system having a first angled section and a second angled section and a gas injection apparatus in accordance with an embodiment of the present invention.

In another embodiment, as shown in FIG. 2, the down pipe 14 and angled pipe section 28 can be configured to comprise a first angled section 28a having a radius of curvature A of from 15° to 60° and a second angled section 28b having a radius of curvature B of from about 5° to about 45°. A second gas injection apparatus, such as a gas blower 29, can be connected to a pipe 31 which can pass through port 33 that extends into the angled pipe section 28a and 28b. The gas blower 29 can inject gas into the angled section 28a and 28b in an upwardly angled direction, such as at about a 45° angle. A benefit to including a gas blower 29 in the angled section 28 is that the gas is added in substantially the same direction as the liquid flow. As the gas bubbles follow their natural tendency to rise, the bubbles are directed with the liquid flow. When gas is applied such as along the gas entrainment tube 20, the natural tendency for the gas bubbles to rise retards the downward liquid velocity in the down pipe 14. By introducing gas into the system at an angle, such as an angle corresponding to the first angled section 28a, the direction of the gas bubbles rising is additive to the direction of the liquid velocity. The gas blower 29 can be used in conjunction with the gas entrainment pipe 20 as a means of increasing the volume of gas present in the first loop 10. In one embodiment, the gas blower 29 can be used as a complete replacement for the gas entrainment tube 20. In another embodiment, the gas blower can receive compressed air from the compressed air storage tank 38.

As shown in FIGS. 1 and 2, the bottom tube 32 can be constructed to have an area of increased volume that allows gas to separate from the liquid as the gas-liquid mixture flows through the bottom tube 32. The area of increased volume can comprise a gas reservoir 34. In one embodiment, bottom tube 32 is flared to form a gas reservoir 34. In another embodiment, bottom tube 32 transitions directly into a gas reservoir 34. The gas reservoir 34 can comprise any suitable volume and dimensions, such as from about 2 to about 20 times the square area of the bottom tube 32.

The gas reservoir 34 can be integrally formed with the bottom tube 32 or can comprise a separate chamber connected to the bottom tube 32 in gaseous communication with the gas contained in gas-liquid mixture in the bottom tube 32. The gas reservoir 34 can be positioned at least partially above the bottom tube 34 to allow gas from the gas-liquid mixture to rise above, and be concentrated from, the liquid phase of the gas-liquid mixture. In one embodiment, from up to about 8 ft.$^3$ of air, such as from about 0.5 ft.$^3$ to about 4 ft.$^3$ of air, can be separated from water given a flow in the down pipe 14 of 1 ft.$^3$ per minute.

As the gas-liquid mixture flows through the bottom tube 32 and into the area of increased volume, the gas phase of the gas-liquid mixture escapes to the lower pressure zone in the gas reservoir 34. At the same time, the liquid phase of the gas-liquid mixture remains in the bottom tube 32 and flows through the remainder of the bottom tube 32. In one embodiment, a liquid breaker 35 can be positioned within the bottom tube 32 prior to the gas reservoir 34 in order to allow greater separation of the gaseous phase from the liquid phase of the gas-liquid mixture contained in bottom tube 32. The liquid breaker 35 can comprise any suitable material such as metal and/or plastic mesh or solid structures. In one embodiment, the liquid breaker 35 can comprise a triangular, conical or circular shape. The liquid breaker can comprise any suitable dimensions such as from about 20 percent to about 100 percent of the cross-sectional area of the bottom tube 32.

Gas collected in the gas reservoir 34 can be extracted through a pipe 36 and diverted into a compressed gas storage tank 38 in which the gas can be stored. The pipe 36 may comprise at least one flow regulation device, such as a one-way valve, pressure gauge, and the like. The compressed gas storage tank 38 can be any suitable gas storage tank and can have any suitable volume and dimensions. In one embodiment the compressed gas storage tank 38 can contain at least 100 times the volume of the gas contained in gas reservoir 34. In one embodiment, at least some gas from the gas storage tank 38 can be discharged back into the system, either directly into the gas entrainment tube 20 or into the down pipe 14 through pipe 39. Pipe 39 can be optionally fitted with valve means to prevent the back flow of liquid through pipe 39 and into the gas storage tank 38.

The liquid phase separated from the gas-liquid mixture in bottom tube 32 subsequently flows through a discharge pipe 40 into a secondary reservoir 42. The secondary reservoir 42 can comprise any suitable storage tank having a volume selected by the user according to the volume flow requirements of the system 10. In one embodiment, the secondary reservoir 42 has a volume capable of holding from about 3 to about 10 times the liquid flow of the liquid in the discharge pipe 40 per minute at a rate specified by the design of the system.

In one embodiment, the secondary reservoir 42 is positioned at a vertical height of from about 30 to about 98 percent of the height H of the down pipe 14. In another embodiment, the secondary reservoir 42 is positioned at a height of from about 75 to about 85 percent the height H of the down pipe 14. In one embodiment, the force of the liquid entering the bottom pipe 32 is sufficient to direct the liquid through the discharge pipe 40 in a substantially vertical direction to a height of from about 30 to about 98 percent, such as about 80 percent, of the height H of the down pipe 14. The height of the discharge pipe 40 can be selected to control the gas pressure output into the compressed gas storage tank 38 of the system. In one embodiment, a plurality of discharge pipes 40 in flow communication with each other can be used to allow liquid to flow from the bottom 32 to the secondary reservoir 42. In another embodiment, the square area of the cross-section of the discharge pipe 40 is about twice the square area of the cross-section of the bottom tube 32.

Gas from the compressed gas storage tank 38 and liquid from the secondary reservoir 42 can be directed to a tank 44 containing a compressed gas-liquid pump during the gas-liquid moving system. In one embodiment, the compressed gas-liquid pump can be a bladder pump or siphon pump as will be described herein. In one embodiment, the tank 44 has a vertical orientation that is lower than the secondary reservoir 42, thereby allowing tank 44 to be at least partially gravity fed by the secondary reservoir 42. Liquid from the secondary reservoir 42 can be directed to the tank 44 through a pipe 46. The pipe 46 can comprise any suitable conventionally known monitoring devices and/or restrictive flow-back devices. The volume of liquid flow in to and out of tank 44 must equal or slightly exceed the volume of liquid flow in down pipe 14.

In one embodiment, the compressed gas-liquid pump contained in tank 44 can be connected to two liquid pipes 46 and 48 and two gas pipes 50 and 52 extending out from the tank 44. The liquid output of the pump can be raised in the vertical direction through pipe 48 and returned to the height of the source liquid area 12. In order to pump liquid to this level, gas having a desired volume and pressure is directed from the compressed gas storage tank 38 along pipe 52 into tank 44 housing the compressed gas-liquid pump.

The required psi of gas contained in the compressed gas storage tank 38 can be determined for a system using air and water according to Equation 1, in which 1 ft.$^3$ of water weighs 62.4 lbs, and the pressure per inch$^2$ of the water is (62.4 lbs./in.$^2$ )/(144 in.$^2$ ) or 0.433 lbs./in.$^2$.

$$20 \text{ ft.} \times 0.433 \text{ psi/ft.} = 8.66 \text{ psi.} \qquad \text{Equation 1}$$

Accordingly, the pressure required to lift the liquid must exceed the value determined by Equation 1. Thus, 1 ft.$^3$ of air at about 9 psi would lift 1 ft.$^3$ of water about 20 feet.

In one embodiment, only a portion of the compressed gas housed in the compressed gas storage tank 38 is directed along pipe 52. Valve means or other regulatory means can be included in pipe 52 to control the flow of gas from compressed air storage tank 38. The amount of gas and timing of the release of gas from the compressed gas storage tank 38 can be controlled via electric timed valves, mechanical valves and/or computer controlled valves. As the volume of compressed gas increases in the tank 44, the liquid housed in tank 44 is forced up pipe 48. In one embodiment, liquid flow back through pipe 48 can be limited by a one-way valve or series of valves. In another embodiment, the pressure of the compressed gas is sufficient to move the liquid in pipe 48 in a substantially vertical direction. In another embodiment, the pressure of the compressed gas is sufficient to move the liquid in pipe 48 from a liquid level below the secondary reservoir 42 to the liquid level 18 in the source liquid area 12.

Once a measured volume of compressed gas is injected into tank 44, pipe 52 can be closed by any suitable valve means to stop the upward movement of liquid in pipe 48.

The pipe 50 can then be opened to remove at least some compressed gas in tank 44. In one embodiment, pipe 50 can be connected to the down pipe 14. The liquid flow down the down pipe 14 can create a lower pressure area at the joint between the pipe 50 and the down pipe 14. The higher pressure gas from tank 44 can be quickly drawn to this area of lower pressure. The joint between the pipe 50 and the down pipe 14 can comprise a valve suitable for allowing gas to pass from pipe 50 and preventing liquid to pass from the down pipe 14 to the pipe 50. The higher pressure gas exiting the compressed gas-liquid pump housed in tank 44 and flowing through the pipe 50 can be recycled into the down pipe 14 to create a higher pressure compressed air to water flow ratio. Gas contained in pipe 50 can be directed directly into the gas entrainment tube 20, into the gas receiving port 22, or into the down pipe 14 at any vertical location provided the exit pressure is sufficiently controlled, such as by valve means, to prevent the flow of liquid in an upward direction in the down tube 14.

As the pipe 50 is opened, the pressure in tank 44 decreases. In one embodiment, a one-way valve in pipe 46 can be opened to allow liquid from the secondary reservoir 42 to flow into tank 44 and fill the space previously occupied by the compressed gas in the tank 44. Once the tank 44 is re-filled with liquid from the secondary reservoir, the gas-liquid moving system can be repeated.

Once the liquid in tank 44 has been moved to a desired level through pipe 48, the gas present in tank 44 must be removed in order to refill tank 44 with liquid for a second pumping cycle. The gas exits tank 44 at the pressure required to move the liquid vertically through pipe 48, which is greater than the pressure of the liquid falling in down pipe 14. The gas can be removed from the tank 44 along pipe 50 and injected back into the falling liquid steam of down pipe 14. The suction draw of the liquid flowing down the down pipe 1 can increase the exit speed of the gas from the gas-liquid pump in tank 44 along pipe 50.

In one embodiment, as described above, the compressed gas-liquid pump can be a bladder pump. In this embodiment, the pipe 52 can be connected to a flexible bladder that can expand to force liquid through tube 48. The bladder can comprise any flexible material, including polymeric material and coated textiles. The bladder pump can provide a defined barrier between the compressed gas and the liquid, thereby preventing the compressed gas from traveling back into the liquid at the liquid-air interface within the pump.

Figure 3:
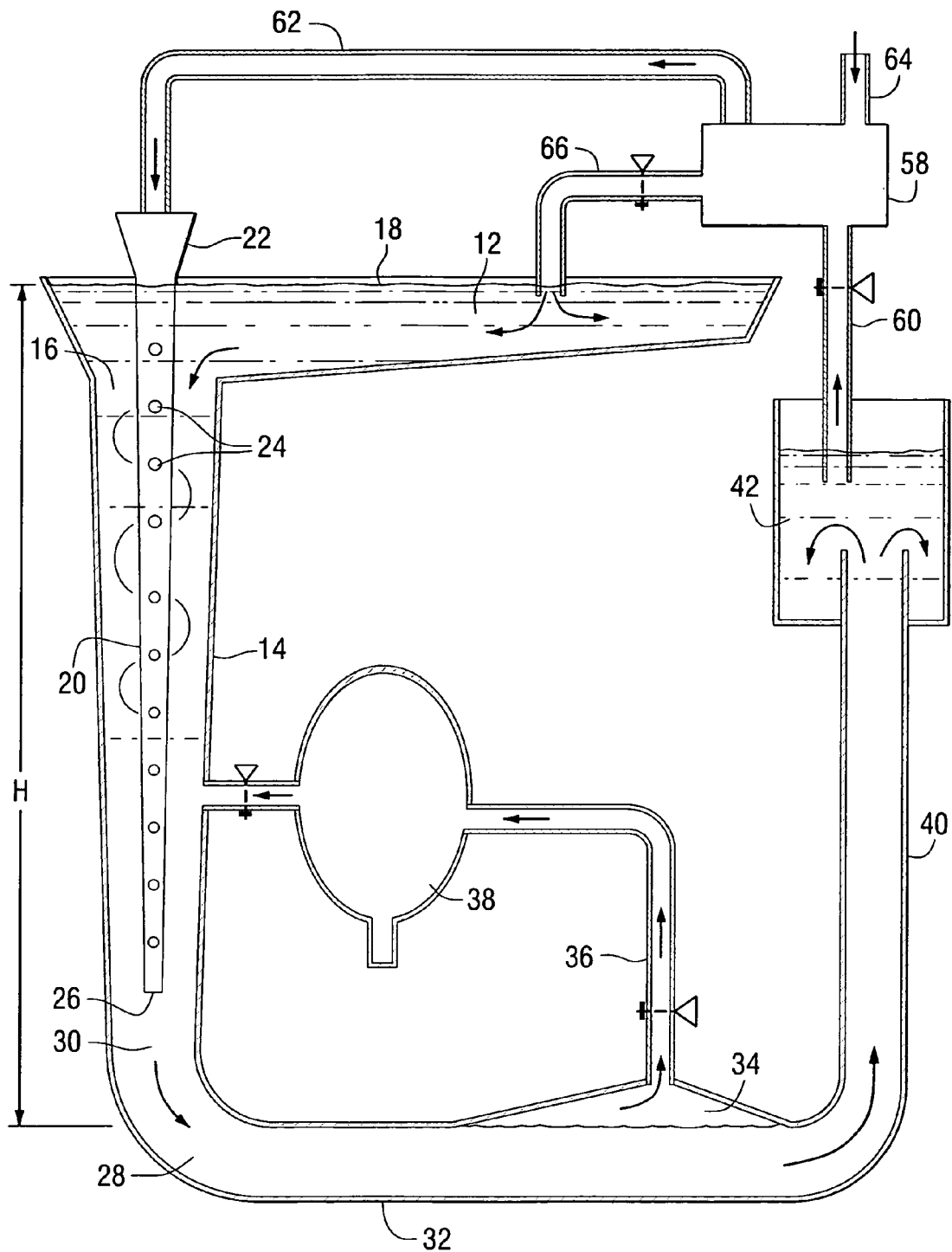
FIG. 3 is a schematic representation of a first loop gas-liquid pumping system including a siphon pump in accordance with an embodiment of the present invention.

In another embodiment, as shown in FIG. 3, the compressed gas-liquid air pump can be a siphon pump. A siphon pump can typically be used when the distance the liquid is forced in a substantially vertical direction is less than about 30 feet. Typically, a siphon pump can be used when the vertical distance the liquid is forced is from about 1 inch to about 25 feet. It is anticipated that any conventional siphon pump can be used in accordance with the present invention.

As shown in FIG. 3, the siphon pump 58 can be connected between the secondary reservoir 42 and an area at or above the liquid level 18 in the source liquid area 12. The siphon pump 58 can be located at least about 1 foot above the liquid level 18 of the source liquid area 12, or greater. A pipe 60 can be at least partially submerged in the secondary reservoir 42 and extend substantially vertically into the siphon pump 58. The pipe 60 can comprise valve means, such as one-way valves, to prohibit liquid from falling back into the secondary reservoir 42. In one embodiment, a gas pipe 62 having suction means, can be connected at about the top of the siphon pump 58. The gas pipe 62 can remove gas from the siphon pump 58 and direct the gas into the gas receiving port 22 for entrainment with the falling liquid in down pipe 14.

When the siphon pump 58 is full of liquid from the secondary reservoir 42, the gas pipe can be shut off using any conventional valve means and a second gas pipe 64 can be opened to allow additional gas from atmosphere or a tank source to enter the siphon pump 58. As the gas enters the siphon pump 58, the liquid flows out the siphon pump 58. In one embodiment, liquid is returned to the source liquid area 12 through a pipe 66. In another embodiment, liquid can be distributed through pipe 66 for land irrigation purposes. The pipe 66 can comprise valve means, such as one-way valves, to prohibit liquid from flowing if desired. Due to the slower nature of siphon pumping, two siphon pumps could be used working in opposite phases of charge/discharge. This design could allow the liquid to gain velocity before the gas is introduced into the first loop system 10. In one embodiment, use of the siphon pump 58 eliminates the need for pipe 50.

When sufficient pressure and volume are established in the tank 44 housing the compressed gas-liquid pump to move the liquid in a vertical distance to the source liquid area 12, no external compressed gas is required. Any gas collected in the compressed gas storage area 38, not required to move the liquid in the vertical direction within the first loop system 10, is "excess gas".

Figure 4:
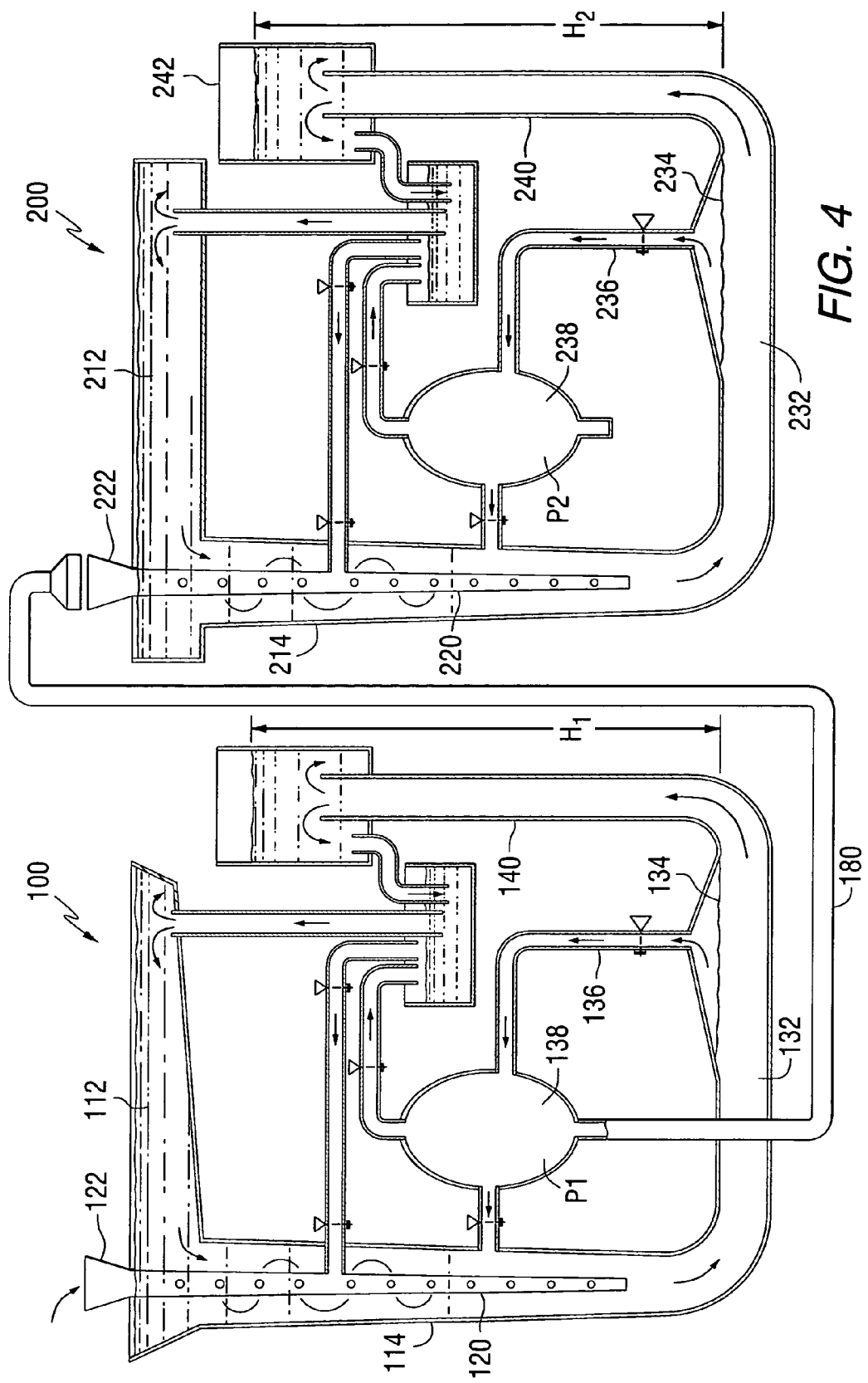
FIG. 4 is a schematic representation of a multiple first loop gas-liquid pumping system in accordance with an embodiment of the present invention.

As shown in FIG. 4, it is contemplated herein that a plurality of first loop systems can be combined and connected to further increase the pressure of the compressed gas. The first stage of first loop system 100 is provided as described above. A first source liquid area 112 can be a closed body of liquid, such as a tank, or an open body of liquid. Liquid travels downwards along the down pipe 114 and gas is introduced through gas receiving port 122 into gas entrainment tube 120. The gas and liquid mix together in the down pipe 14 and flow together into the bottom tube 132. The gas is separated in the gas reservoir 134 and directed through pipe 136 into a first compressed gas storage tank 138. The pressure P1 of the gas contained within the first compressed gas storage tank 138 is equal to 0.433 psi multiplied by the height H1 of the discharge pipe 140. The remaining components of the first stage of the first loop system 100 function as described above.

In order to increase the gas pressure of the first stage of the first loop system 100, a second stage of the first loop system 200 is added to take the pressurized gas from the first compressed gas storage tank 138 and direct the gas to a second stage of first loop system 200. The second stage of the first loop system 200 is fully enclosed to maintain the pressure P1 from the first compressed gas storage tank 138 including the source liquid area 212 and the secondary reservoir 242. By enclosing all of the components, the pressure generated from the first stage of the first loop system is maintained.

In this embodiment, at least a portion of the gas housed within the first compressed gas storage tank 138 is directed to a second gas receiving port 222 of the second stage of the first loop system 200 through pipe 180. A second down pipe 214 receives liquid from the enclosed second source liquid area 212 and the gas introduced into the second gas receiving port 222 and the liquid mix together in the second down pipe 214 and flow together into the second bottom tube 232. The gas is separated in the second gas reservoir 234 and is directed through pipe 236 into a second compressed gas storage tank 238. The remaining components of the second stage of the first loop system 200 function as described above.

The second stage of the first loop system 200 can be configured in the same manner as described herein, however, due to the increased gas pressure provided from the first compressed gas storage tank 138 to the second stage of the first loop system, a higher pressure P2, less any inefficiencies, can be achieved in the second compressed gas storage tank 238. The pressure P2 achieved in the second compressed gas storage tank 138 is determined according to Equation 2, where P1 is the pressure achieved in the first compressed gas storage tank 138, and H2 is the height of the second discharge pipe 240:

$$P2=P1+0.433 \text{ psi}\times H2 \qquad \text{Equation 2}$$

Figure 5:
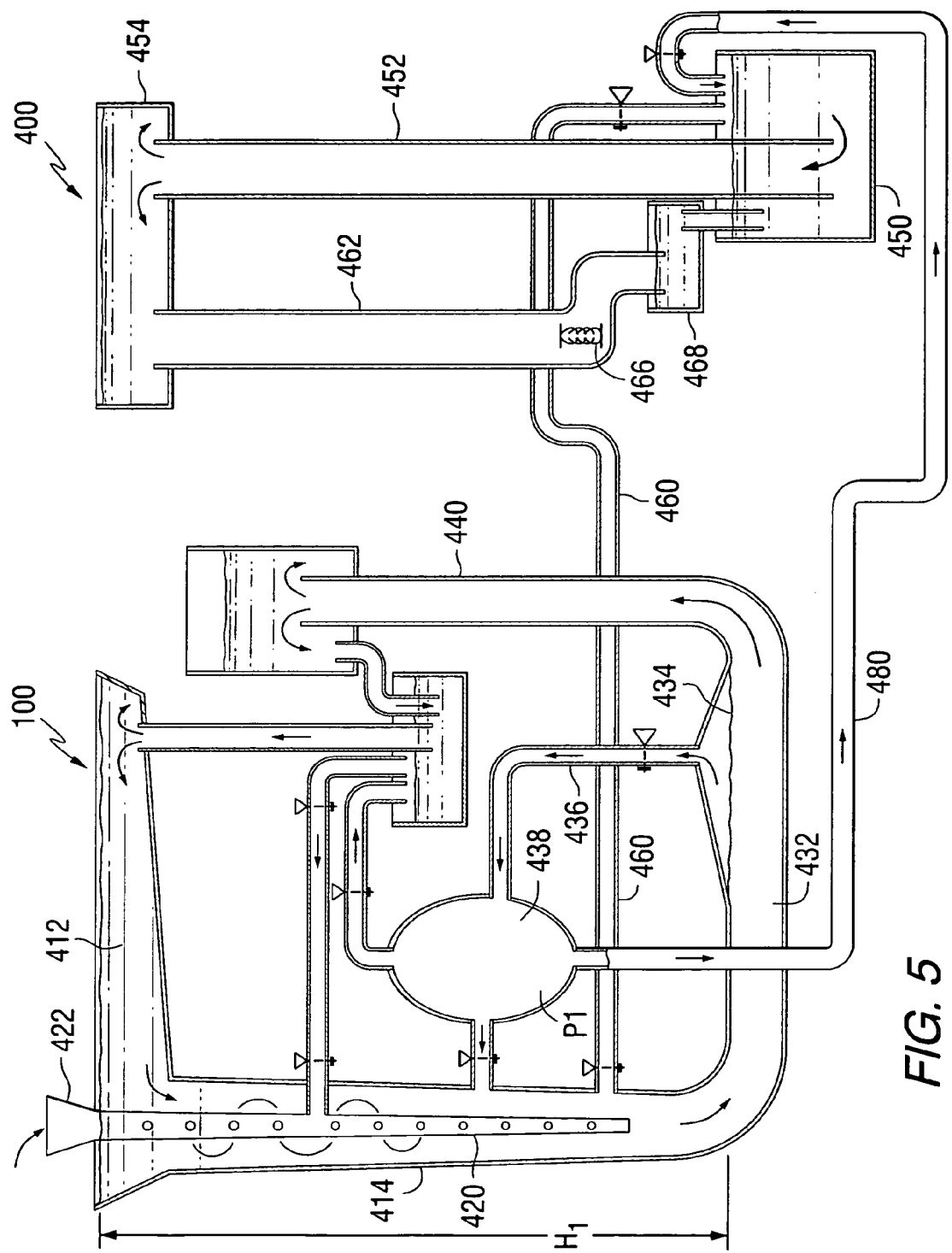
FIG. 5 is a schematic representation of a first loop and second loop gas-liquid pumping system in accordance with an embodiment of the present invention.

As shown in FIG. 5, the compressed gas generated by the first loop system(s) 100 and/or 200 shown in FIGS. 1-4 can be introduced into a second loop system 400. In one embodiment, the second loop system 400 can be positioned above ground and the first system 100 can be positioned at least partially underground. In another embodiment, the second loop system 400 can be positioned at any desired location adjacent the first system 100. The components of the second loop system 400 are all enclosed thereby making a closed loop system and preserving the input pressure from the first loop system. In this embodiment, a first loop system is initiated as described above. Liquid from a source liquid area 412 travels downwards along the down pipe 414 and gas is introduced through gas receiving port 422 into gas entrainment tube 420. The gas and liquid mix together in the down pipe 414 and flow together into the bottom tube 432. The gas is separated in the gas reservoir 434 and directed through pipe 436 into a compressed gas storage tank 438. The remaining components of the first loop system function as described above.

At least a portion of the compressed gas from the compressed gas storage tank 438 is directed to the second loop system 400 by pipe 480. Pipe 480 provides compressed gas to tank 450 housing a second compressed gas-liquid pump. In one embodiment the compressed gas-liquid pump can be a bladder pump. Valve means or other regulatory means can be included in pipe 480 to control the flow of gas from the compressed gas storage tank 438. In another embodiment, the flow of gas from the compressed gas storage tank 438 can be controlled via a remote computer. As compressed gas from the compressed gas storage tank 438 is fed into the 450 tank containing the second compressed gas-liquid pump, liquid in the tank 450 can be forced substantially vertically through a pipe 452 to a second body of liquid 454 or other liquid return area. In one embodiment, the pressure of the compressed gas entering the tank 450 housing the second gas-liquid pump is sufficient to move the liquid in the tank 450 to a height of from about 40 to about 98 percent the height of the discharge pipe 440 in the first loop system. If gas having 40 psi is separated from the liquid in the gas reservoir 434, then the second compressed gas-liquid pump housed in tank 450 could raise liquid to an equilibrium maximum height of (40 psi/ft) divided by 0.433 from Equation 1, to reach a height of 92 ft.

In one embodiment, a return pipe 460 is provided in gas-flow communication with the second compressed gas liquid pump housed in tank 450. Once sufficient pressure is established in the tank 450 housing the compressed gas-liquid pump, any excess gas can be removed from the tank 450 through return pipe 460. The return pipe 460 can be connected to the down pipe 414 to allow the excess gas to be incorporated into the liquid flowing downward in the down pipe 414. By returning the compressed gas from the second loop system 400 after it has displaced the liquid in the tank 450 containing the second compressed gas-liquid pump to the down pipe 414, the resulting volume of compressed gas is increased in the first loop system. Any suitable valve means can be included in the return pipe 460 to allow gas to enter the down pipe 414 and prevent liquid in the down pipe 414 from entering the return pipe 460.

The second compressed gas-liquid pump housed in tank 450 can function in the same manner as the first compressed gas-liquid pump shown in FIGS. 1-3, however, the second compressed gas-liquid pump can pump at a higher pressure.

As shown in FIG. 5, the liquid forced up pipe 452 can be directed to a second body of liquid 454, such as a reservoir. Liquid collected in second body of liquid 454 can be directed to flow down a pipe 462 by gravitational forces. In one embodiment, the down pipe 462 has a vertical height that is shorter than the vertical height of pipe 452. In one embodiment, a hydropower generator 466 used to produce electricity can be positioned within pipe 462. In another embodiment, liquid discharged from the hydropower generator 466 can be discharged into an open tank 468 which can be subsequently used to provide liquid to tank 450 housing the second compressed gas-liquid pump.

Figure 6:
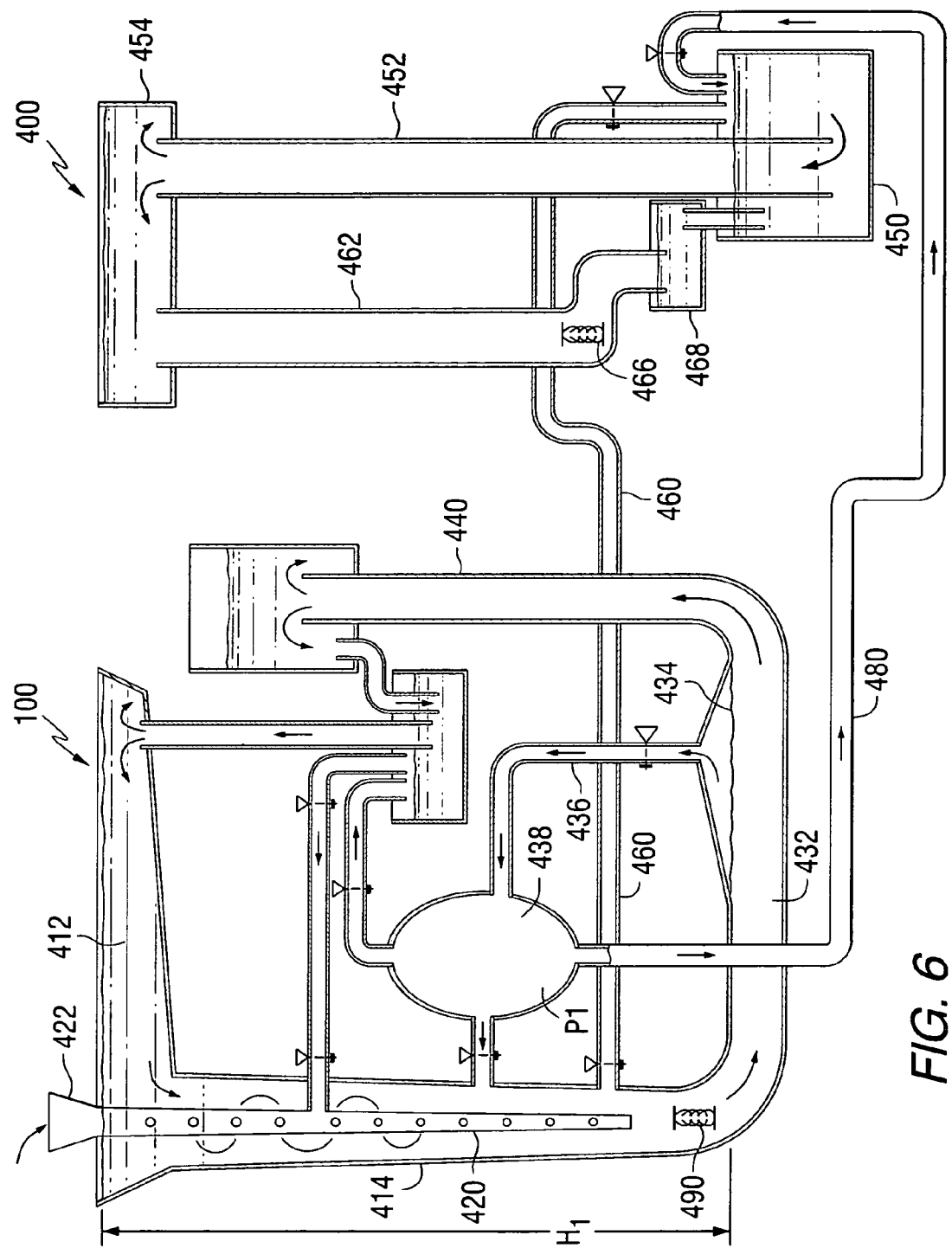
FIG. 6 is a schematic representation of a first loop and second loop gas-liquid pumping system comprising a turbine in the first loop system in accordance with an embodiment of the present invention.

In another embodiment, as shown in FIG. 6, a conventional turbine 490 can be positioned at the bottom of the down pipe 414. A rotating propeller of the turbine could be positioned in the down pipe 414 to separate the gas phase and the liquid phase present in the down pipe 414. In another embodiment, the turbine 490 can be positioned within gas reservoir 434 to reduce the back pressure applied to the turbine 490 as a result of the liquid velocity falling in the down pipe 14. In both embodiments, liquid falling downwards in down pipe 414 causes the propeller to spin. The rotating propeller of the turbine can be connected to a generator that can be used to produce electricity. As the propeller rotates, it can power any traditional hydroelectric generator. The electricity produced by the generator could be in addition to the power generated by the rotation of the hydropower generator 466 of the second loop system 400.

The piping and containment vessels of the present invention can comprise any material, such as any polymeric material or any sufficiently durable metal. The piping and containment vessels of the present invention can be coated with a variety of coatings including corrosion resistance coatings. The dimensions of the system can be selected in part based on the density of the liquid to be pumped and the desired power output. The power produced as a result of the present invention can be used to power any device or system conventionally powered by coal, oil, natural gas or wood. In addition, the power produced by the present invention can be used to operate a hydrogen-producing system. The generation of power depends in part on the height of the down tube 1 and pipe 4 as will be explained by the following examples.

EXAMPLE 1

A partial system set-up was constructed to demonstrate that a relatively low air pressure can be used to pump water in a system as described above at a rate sufficient to sustain the water-air hydraulic cycle. With the proper height ratio of down pipe height to discharge pipe height the system can return liquid to the starting point within the system.

A first rack was positioned 234" above the ground and a source liquid area tank having a 175-gallon volume was positioned on the first rack. The sides of the source liquid area tank were 14" high. Water was fed from the source liquid area tank into a funnel at the top of a down pipe comprising a 3" length of 4" diameter pipe connected to a 4" length of 3" diameter pipe connected to an 8" length of 2" diameter pipe connected to a 1.5" diameter plastic pipe having a length of 209". The total length of the down pipe was 224". Water was introduced to the funnel by a 2" right angle pipe connected to a 1.375" butterfly valve extending out of the source liquid area tank.

The water flowed downwards in the down pipe into a 55-gallon drum air separator turned on its side positioned on the ground. The air separator had a 2" cast iron pipe welded to the side of the barrel. The cast iron pipe was oriented to accept the 1.5" diameter plastic down pipe and was connected by rubber grommets to prevent air and water leakage. The plastic down pipe extended 1" within the air separator. At the end of the down pipe a 1" plastic end cap was riveted with the rounded end being exposed to the water stream traveling downwards in the down pipe. A 1.5" gap was located between the end of the down pipe and the end cap. The end cap functioned to disperse the water and allow the air trapped in the down stream to escape from the water into the air separator. The water exited the air separator by a 2" horizontal plastic pipe positioned below the water level in the air separator. In order to visualize the water level, a sight glass was installed in the air separator. The air separator has a 1" air exit valve positioned near the top of the air separator for extracting the compressed air to maintain a constant water level in the air separator.

The exit bottom water pipe had a length of 7 feet and was bent upward in a 90° angle into a discharge pipe having a height of 179". The top of the discharge pipe was connected with a right angle pipe and a 45° angle pipe so that exiting water would flow into a secondary reservoir positioned on a second rack having a height of 165.5" above the ground. The secondary reservoir was similar in size to the source liquid area tank. Water from the secondary reservoir flowed into the top of a 55-gallon barrel gas-liquid pump positioned on a third rack located 129" above the ground through a 2" ball valve. The valve was used to shut down the flow of water from the secondary reservoir into the air-water pump when the unit was not operating.

Under working conditions, the water flow into the air-water pump was controlled by the air pressure present in the pump. If the air pressure was below 1 psi, water could flow into the air-water pump. Two air valves controlled by an electric tether switch were used to control the pressure within the pump. When a first valve was opened, the second valve was closed. During operation, compressed air from the air separator was put into the air-water pump and increased pressure within the pump. When the pressure exceeded 4.1 psi, the water was pumped to the liquid source area tank. Water was prevented from returning to the secondary reservoir by a one-way check flow valve.

Once the water level dropped below a water level determined by the tether switch, the air valves reverse their position. The pressurized air at 4.1 psi from the air water pump was removed from the air-water pump and was available to recycle back into the down pipe to increase the compressed air output of the hydraulic air compressor. Once the compressed air exited the air-water pump, the air pressure returned to a level below 1 psi and the water from the secondary reservoir flowed into the air-water pump to initiate a new cycle. Water in the 2" discharge pipe from the air-water pump was prevented from entering the air-water pump by a directional flow valve.

The air exit valve from the air separator was connected to a 100-gallon air tank that served as a compressed air storage tank. Air collected in the compressed air storage tank was used to supply compressed air to the air-water pump for moving water from the secondary reservoir to the liquid source area tank. The amount of air entrained by the system was not sufficient to fully sustain the process.

EXAMPLE 2

The second trial was made using the system of Example 1 with several modifications. A clear plastic 2" diameter pipe was attached below the funnel. Inside the 2" pipe a 1" gas entrainment pipe with 0.125" holes drilled into the sides was inserted. The gas entrainment pipe was used to supply air to the stream of water traveling down the down pipe. The 1" plastic pipe had a 1.25" outer diameter and the area difference between the 2" inner diameter down pipe and the 1.25 outer diameter gas entrainment pipe was 1.914 in$^2$. This was slightly bigger than the area of a 1.5" inner diameter pipe (1.76 in$^2$). For this evaluation, the areas of the two pipes when joined were considered equivalent. The 1" pipe extended into the 2" clear plastic pipe a length of 10 feet. The 1" pipe extended upwards such that the 1" pipe stuck out three feet above the funnel entrance and above the water level of the liquid source area tank. This was constructed to prevent water, seeking its own level, from coming back up the 1" air pipe and overflowing.

The holes drilled in the 1" air pipe were located as follows: starting at 3 feet below the funnel and at each one foot increment, three 0.125" diameter holes were drilled around the circumference of the gas entrainment pipe. At the bottom of the pipe, a 1" end cap was cemented on and two 0.125 holes were drilled in the vertical direction. In operation, the system produced 6.5 to 7 psi in the air separator at a sufficient volume to allow air at 7 psi to accumulate in the compressed gas storage tank. In operation, the system could not pump water fast enough with the 2" discharge pipe from the air-water pump. Visually, it was observed that air from inside the 1" gas entrainment pipe was being sucked into the down pipe. However, the only location bubbles were visualized entering the stream was through the bottom two rows of 0.125" holes and the bottom vertically drilled holes. It was also noted that the water stream sped up with the small reduction of area transitioning from the 2" pipe to the 1" pipe transitioning to the 1.5" pipe. This increase in speed carried bubbles downward at a rate faster than their natural tendency to rise upwards. It was determined that a longer down pipe would have created sufficient pressure in the air separator. An additional height of 10 feet in the down pipe would have provided 10.32 psi at the air separator. The pumping height would have been increased from 107.5" to 142". This would take the pumping requirement from 4.1 psi to 5.12 psi.

EXAMPLE 3

The third trial was made using the system of Example 2 with several modifications. The water height of the down pipe was increased by removing the funnel and the 1" air pipe and connecting the down pipe to the liquid source area tank by a 90° 2" fitting. This raised the water fall level to 242" or 20.33 ft. This arrangement eliminated any air entrapment in the down pipe until the air was injected at the 212" level down from the liquid source area tank. With this arrangement, the water flow is maximized since there is no air in the water prior to the introduction of the air entrainment pipe. At the 17.67 ft depth, the water pressure was measured at 7.65 psi.

Two air injectors were constructed to inject air into the falling water stream. The two injectors were made of ⅜" copper tubing. One tube section was drilled with thirteen ¹⁄₁₆" holes along a 6" distance. The second tube section was made from a similar copper pipe but was cut at a 60° angle to the vertical, to expose a longer tube cross-section to the water. The copper pipes were placed at 212" down from the top of 17.67 feet. The air flow was visually observed in the water stream through the clear plastic pipe. We observed that the thirteen 1/16" holes put smaller bubbles into the water stream but did not deliver as much air volume as the other design. The cut copper pipe allowed for more air to enter the system. During this trial, we noted that air did not flow into the down pipe at the injector until the air source exceeded the water pressure at that depth. At 6 psi, no air would flow into the falling water stream. At 7.5 psi, we could see some small bubbles. Significant air flow into the stream was observed at 8 psi. Using an external compressor to supply air at 8 psi and 3 scfm, the system was able to pump itself and maintain balance. The system was run continuously for a 45 minute period of time. This trial showed that air can be continually injected into the system and maintain a balance for the water flow.

EXAMPLE 4

The fourth trial was made using the system of Example 3 with several modifications. The water stream was exposed to a full air curtain contained inside a 3" T-pipe connector. The 1.5" diameter down pipe was put into the 3" section of the T-pipe connector until it was 1" below the 1.5" side openings of the connector. At the bottom a 1.5" exit pipe was located. The 3" openings were made to accept a 1.5" diameter pipe by stepping down the side using rubber grommets. Air was supplied to this injector from an external compressor. The air introduced into the falling water stream traveled 40" in order to exit the pipe in the air separator. With this arrangement, an increased level of bubble production was observed. Duplicate test runs indicated that the downstream of water would accept 4.5 scfm at 8.1 psi before the water flow was at least partially reversed from down to up. Using this configuration, the water flow exiting the discharge pipe was measured.

If no air was introduced, the water flow rate exiting the discharge pipe was 4.70 cu ft/min. When air at 8.1 psi was introduced, this was measured as 3.5 scfm in the flow of water, resulting in a rate in the discharge pipe of 2.88 cu ft/min. In a second trial, when air at 8.1 psi was introduced, this was measured as 4.5 scfm in the flow of water, resulting in a rate in the discharge pipe of 2.61 cu ft/min. This measurement shows that the flow of water in the down tube decreases as the entrainment of air increases.

EXAMPLE 5

The fifth trial was made using the setup of Example 4 with several modifications. A new pump was constructed with a 3" discharge pipe as compared to the original 2" pipe. This reduced the pumping time in half. Timed measurements showed that the pumping time for the same volume (1.75 cu ft) of water was reduced from 26.5 to 16.25 seconds. The down pipe was reconfigured to include an upwardly slanting section having an uphill slope of 15°. In this Example, additional air was injected into the liquid stream on the up hill direction. The air flow was naturally angled upwards thus preventing a backwards flow of the water in the down pipe. An oval shaped notch was cut in the pipe gas blower pipe at a 45° angle to the pipe surface. The height of the water column was 247". The corresponding water pressure was measured to be 8.91 psi. The air separator was kept at 6.8 psi during operation to maintain a stable water level in the air separator. The discharge pipe height was reduced to 177" having a pressure level of 6.39 psi for equilibrium. The results from this experiment are as follows. When air having 9 psi was introduced to the system, 4.5 scfm of excess air was produced and a water flow of 3.75 cu ft/min was observed in the discharge pipe. When air having 9.5 psi was introduced to the system, 7.25 scfm of excess air was produced and a water flow of 3.55 cu ft/min was observed in the discharge pipe. When air having 10.5 psi was introduced to the system, 8.5 scfm of excess air was produced and a water flow of 3.56 cu ft/min was observed in the discharge pipe. In each of these trials, excess air was generated that could be used to supply gas to a second loop system. When no air was added to the system, a water flow of 3.86 cu ft/min was observed in the discharge pipe.

The injection of supplemental air into the water stream on an uphill incline did not effect the water flow rates as had been previously observed. A significant amount of excess air was generated by the system that is available for subsequent water pumping and/or energy production. The system as described above was maintained for a period of about one hour.

EXAMPLE 6

In a unit having a down pipe extending 50 feet in the vertical direction and a discharge pipe extending 40 feet in the vertical direction, the maximum pressure for water at the bottom of down pipe is equal to 0.433 psi/ft.×50 feet=21.65 psi. Compressed air entrained in the water then separates from the water as it moves along the bottom tube and is collected in the air reservoir. The water continues to flow in bottom tube until it starts to flow upward in the discharge pipe. The water then fills the discharge pipe, causing a back pressure in the water, preventing the compressed air from escaping. The height of the discharge pipe determines the maximum pressure that can be collected in the air reservoir. In this example, the discharge tube is 40 feet tall and the pressure in the air reservoir is air pressure=0.433 psi/ft.×40 ft.=17.32 psi.

As the water exits the discharge tube, it is collected in a tank which feeds water to the compressed gas liquid pump. The bottom of the pump is located 2 feet below the exit of the discharge pipe. Given this configuration, there is a need to pump water up 12.5 feet to a position above the entrance height of the down pipe. In order to pump water vertically a distance of 12.5 feet, the system needs to produce an equilibrium pressure of at least 12.5×0.433 psi/ft.=5.41 psi. Accordingly, in order to move 1 ft.$^3$ of water in a vertical direction, 1 ft.$^3$ of air at 5.41 psi is required. In this example, the first loop system 40 produces a pressure of 17.32 psi and an air volume of at least 0.75 ft.$^3$ of air per ft.$^3$ of water flow in the first loop system 40.

When the compressed gas is extracted from the air reservoir of the bottom tube, it is directed to the accumulator tank, which collects the air and maintains a pressure of 17.32 psi. Regulators are used to remove the compressed air from the accumulator tank at 7 psi. This compressed air is then fed into a tank housing a compressed gas liquid pump. The movement of 1 ft.$^3$ of water in the vertical direction requires 1 ft.$^3$ of air at 7 psi. Since the pressure at one location multiplied by the volume of the location space is equal to the pressure at a second location multiplied by the volume of the second space, 0.75 ft.$^3$ of air in the air reservoir is equivalent to 1.85 ft.$^3$ at 7 psi. Accordingly, this satisfies the minimum requirements of 1 ft.$^3$ of compressed gas required to move 1 ft.$^3$ of water up 12.5 feet.

In this example, the first loop system produces enough compressed gas to force the liquid to a height that is equivalent to the starting height of the process, leaving 0.85 ft.$^3$ of compressed gas at 7 psi available for additional pumping. The excess compressed air is 0.34 ft.$^3$ of compressed gas at 17.32 psi after the 1 ft.$^3$ of water that produced the compressed gas is returned to the first altitude in first loop system.

In this example, in order to increase the quantity of compressed gas produced by first loop system, the compressed gas used to lift the liquid in compressed air liquid pump is re-introduced into the down pipe. Once the compressed air storage tank is full, the system has compressed gas available for pumping at the rate it is removed from the air reservoir in the bottom tube. In order to maintain the flow in the down pipe, the process must produce at least 0.404 ft.$^3$ of compressed air at 17.32 psi. This is the equivalent of 1 ft.$^3$ at 7 psi. Thus, any quantity of compressed gas produced over 0.404 ft.$^3$ is available for pumping in the second loop system.

In this example, 0.5 ft.$^3$ of compressed air is required to maintain the process in first loop system. Table 1 shows the quantity required for the system and the amount of air that can be made available for pumping liquid vertically from the tank housing the compressed air liquid pump to a height equal to the starting height of the system.

Accordingly, with a production rate of 4 ft.$^3$ compressed gas per ft.$^3$ of water flow in the first loop system, 0.5 ft.$^3$ of compressed gas would be required to recycle the water in the loop 3.5 ft.$^3$ of compressed gas is available to pump liquid by using the compressed gas liquid pump 17 of the second loop. Due to potential pressure losses in the system, compressed gas transported to the compressed gas liquid pump has a pressure of 13 psi. Accordingly, at this pressure, water can be lifted vertically to a height of 13 psi/0.433 psi/ft.=30 feet. In order for water to be pumped in a vertical direction, the desired height must be below 30 feet. If the desired height is 25 feet, the electrical power generated by this system is power (KW)=(Q×height×efficiency)/11.8, where Q is the water flow in ft.$^3$/sec. through the generator, height is 25 feet, the efficiency is 80% and 11.8 is a constant to convert flow/sec. to KW.

If the flow in the down pipe, having a 2 inch diameter, of the first loop is 10 ft.$^3$ per minute, then Table 2 shows the potential power output at various compressed gas ratios to water flow in the down pipe.

TABLE 2

| Water Flow in Down Pipe (ft.$^3$/minute) | Water Flow/second in Down Pipe (ft.$^3$/second) | Ratio of Compressed Air to Water Flow | Excess Compressed Gas Produced (ft.$^3$) | Height of Down Tube for Second Loop (ft.) | Water Flow in down pipe of Second Loop (ft.$^3$/second) | Energy Output of System (KW) |
|---|---|---|---|---|---|---|
| 10 | 0.166 | 0.75:1 | 0.25 | 25 | 0.0415 | 0.070 |
| 10 | 0.166 | 2:1 | 1.5 | 25 | 0.249 | 0.420 |
| 10 | 0.166 | 3:1 | 2.5 | 25 | 0.415 | 0.70 |
| 10 | 0.166 | 4:1 | 3.5 | 25 | 0.581 | 0.98 |

TABLE 1

| Ratio of Air: Water Flow in the Down Pipe | Ft.$^3$ Of Compressed Gas To Maintain Process At 7 psi in the Compressed as Storage Tank | Ft.$^3$ Of Excess Compressed Gas Produced Available To Pump Water at 17.32 psi |
|---|---|---|
| 2:1 | 0.5 | 1.5 |
| 3:1 | 0.5 | 2.5 |
| 4:1 | 0.5 | 3.5 |

In this example, the compressed gas liquid pump of the first loop and the compressed gas liquid pump of the second loop function at two different pressure levels due to the different heights each pump must force water to. The compressed gas liquid pump of the first loop moves liquid to a height of 20% of the height (H) of the down pipe whereas the compressed gas liquid pump of the second loop moves liquid to a height of 50% of the height (H) of the down pipe.

EXAMPLE 7

Table 3 shows the calculation of the volume and flow values for a small system down pipe having a height (H) of 20 feet and a discharge pipe having a height of 16 feet the pipe diameters range from 2 inches to 8 inches.

TABLE 3

| Pipe Diameter | Pipe Radius | Pipe Area | Pipe Volume In Cubic Inches Per Foot Of Length | Pipe Volume In Cubic Feet Per Foot Of Length | Cubic Feet Of Water Flow Per Second At A Water Velocity Of 2 ft./sec. | Cubic Feet Of Water Flow Per Minute At A Water Velocity Of 2 ft./sec. | Gal./min. |
|---|---|---|---|---|---|---|---|
| 2 | 1 | 3.1416 | 37.6992 | 0.022 | 0.0436 | 2.618 | 19.58264 |
| 4 | 2 | 12.5664 | 150.7968 | 0.087 | 0.1745 | 10.472 | 78.33056 |
| 6 | 3 | 28.2744 | 339.2928 | 0.196 | 0.3927 | 23.562 | 176.2438 |
| 8 | 4 | 50.2656 | 603.1872 | 0.349 | 0.6981 | 41.888 | 313.3222 |

Table 4 shows the calculation of the pressure developed at the bottom of the down tube of the first loop, the collection pressure for various heights of the discharge tube, the return compressed gas liquid pump minus the exit height plus 2 feet for collection of water within the reservoir, and the equilibrium pressure required to move the water in the vertical direction to the initial height by the compressed gas liquid pump.

TABLE 4

| Drop (ft.) | Pressure at Bottom (psi) | Discharge Height (ft.) | Exit Pressure (psi) | Return Pump Height (ft.) | Required Return Pressure |
|---|---|---|---|---|---|
| 20 | 8.66 | 16 | 6.93 | 6 | 2.60 |
| 20 | 8.66 | 17 | 7.36 | 5 | 2.17 |
| 15 | 6.50 | 12 | 5.20 | 5 | 2.17 |
| 10 | 4.33 | 8 | 3.46 | 4 | 1.73 |

Table 5 shows the calculated power generated in the second loop system for a 2 inch pipe 16, a given height, a given flow per/sec. and 80% efficiency. The power in KWh is determined by: KW–(flow (ft.$^3$/sec.)×height (ft.)×efficiency)/11.8.

TABLE 5

| KWh produced in 2 in pipe | Height | Flow (ft.$^3$/second) | Watts | Water/Air Ratio | Air required (ft.$^3$) |
|---|---|---|---|---|---|
| 0.0222 | 15 | 0.0218 | 22.2 | 1:1 | 0.5 |
| 0.0665 | 15 | 0.0654 | 66.5 | 1:2 | 1.5 |
| 0.1108 | 15 | 0.109 | 110.8 | 1:3 | 2.5 |
| 0.1552 | 15 | 0.1526 | 155.2 | 1:4 | 3.5 |
| 0.0207 | 14 | 0.0218 | 20.7 | 1:1 | 0.5 |
| 0.0621 | 14 | 0.0654 | 62.1 | 1:2 | 1.5 |
| 0.1035 | 14 | 0.109 | 103.5 | 1:3 | 2.5 |
| 0.1448 | 14 | 0.1526 | 144.8 | 1:4 | 3.5 |
| 0.0192 | 13 | 0.0218 | 19.2 | 1:1 | 0.5 |
| 0.0576 | 13 | 0.0654 | 57.6 | 1:2 | 1.5 |
| 0.0961 | 13 | 0.109 | 96.1 | 1:3 | 2.5 |
| 0.1345 | 13 | 0.1526 | 134.5 | 1:4 | 3.5 |
| 0.0177 | 12 | 0.0218 | 17.7 | 1:1 | 0.5 |
| 0.0532 | 12 | 0.0654 | 53.2 | 1:2 | 1.5 |
| 0.0887 | 12 | 0.109 | 88.7 | 1:3 | 2.5 |
| 0.1241 | 12 | 0.1526 | 124.1 | 1:4 | 3.5 |

In this example where the down tube of the first loop system is 20 feet, the discharge tube is 16 feet and the down tube of the second loop system is 12 feet, a 2 inch diameter down pipe of the first system has a flow of 2.618 ft.$^3$/minute or 19.58 gallons per minute. The compressed air at the bottom of the down pipe is 8.66 psi and can be collected from the air reservoir at 6.93 psi. The tank housing the compressed gas liquid pump of the first system requires 1 ft.$^3$ of compressed gas at 2.60 psi to move the liquid vertically to the initial starting position. When the first loop is running, it produces from 1:1 to 1:4 water to compressed air flow volume. At a 1:1 water flow to compressed air ratio, 17.7 watts are produced. At a 1:2 water flow to compressed air ratio, 53.2 watts are produced. At a 1:3 water flow to compressed air ratio, 88.7 watts are produced. At a 1:4 water flow to compressed air ratio, 124.1 watts are produced.

Whereas particular embodiments of this invention have been described above for purposes of illustration, it will be evident to those skilled in the art that numerous variations of the details of the present invention may be made without departing from the invention as defined in the appended claims.

What is claimed is:

1. A hydraulic liquid pumping system for compressing gas, comprising:
    a body of liquid;
    a source of gas open to atmosphere;
    a down pipe having a pipe opening in fluid communication with the body of liquid, wherein at least a portion of the body of liquid is positioned above the pipe opening;
    a gas injection apparatus having a gas access port therein, the gas injection apparatus for entraining gas into the liquid as the liquid passes through the down pipe, the down pipe and the gas injection apparatus structured and arranged to compress the gas;
    a separator in communication with a lower end of the down pipe for separating compressed gas from the liquid; and
    a gas-liquid recycle loop, comprising:
        a compressed gas storage vessel containing the separated gas;
        a reservoir containing liquid separated from the compressed gas; and
        a gas-liquid pump having a gas inlet in communication with the gas storage vessel, and a fluid inlet in communication with the reservoir, the gas-liquid pump structured and arranged for pumping the liquid to the body of liquid and delivering at least a portion of the gas to the gas injection apparatus.

2. The system of claim 1, further comprising a turbine in fluid communication with the liquid that passes through the down pipe.

3. The system of claim 1, wherein the gas injection apparatus comprises a gas entrainment tube disposed substantially within the interior of the down pipe.

4. The system of claim 1, wherein the gas injection apparatus comprises a gas blower positioned adjacent a lower end of the down pipe, the gas injection apparatus structured and arranged to supply gas to the liquid that passes through the down tube at an angle.

5. The system of claim 1, further comprising a discharge pipe having a first end in fluid communication with the liquid that passes through the down pipe and a second end in fluid communication with the reservoir.

6. The system of claim 5, wherein the discharge pipe has a vertical height of from about 30 to about 98 percent the vertical height of the down pipe.

7. The system of claim 1, further comprising a second loop, comprising:
    a second body of liquid;
    a second down pipe in fluid communication with the second body of liquid; and
    a second gas-liquid pump having a second gas inlet in communication with the compressed gas storage area, a second liquid inlet in communication with the second liquid that passes through the second down pipe, the second gas liquid pump structured and arranged for pumping the second liquid to the second body of liquid.

8. The system of claim 7, wherein the second loop is a closed loop system for maintaining the gas pressure of the compressed gas from the compressed gas storage area.

9. The system of claim 7, further comprising a second turbine in fluid communication with the second liquid that passes through the second down pipe.

10. A hydraulic liquid pumping system for compressing gas, comprising:
    a body of liquid;

a down pipe having a pipe opening in fluid communication with the body of liquid, wherein a least a portion of the body of liquid is positioned above the pipe opening;

gas directing means for entraining gas into the liquid as the liquid passes through the down pipe, the down pipe and the means for introducing gas into the liquid structured and arranged to compress the gas;

means for separating the compressed gas from the liquid in communication with a lower end of the down pipe;

means for recycling at least some of the separated gas back to the means for introducing gas into the liquid; and means for recycling the liquid separated from the compressed gas back to the body of liquid.

11. The system of claim 10, further comprising means for storing the separated compressed gas.

12. The system of claim 10, further comprising means for containing the liquid separated from the compressed gas.

13. The system of claim 10, further comprising means for rotating a turbine with the liquid passing through the down pipe.

14. The system of claim 10, further comprising:
a second body of liquid;
a second down pipe in fluid communication with the second body of liquid; and
means for using the separated gas to recycle the liquid that passes through the second down pipe back to the second body of liquid.

15. The system of claim 14, wherein the second body of liquid, the second down pipe and the means for using the separated gas comprise a closed loop system for maintaining the gas pressure of the separated gas.

16. The system of claim 14, further comprising means for rotating a second turbine with the second liquid passing through the second down pipe.

17. A method of pumping liquid to compress gas, comprising the steps of:
providing a body of liquid;
providing a down pipe having a pipe opening in fluid communication with the body of liquid, wherein at least a portion of the body of liquid is positioned above the pipe opening;
providing gas directing means adjacent the pipe opening;
entraining gas from a gas injection apparatus into the liquid as the liquid passes through the down pipe to produce a compressed gas;
separating the compressed gas from the liquid by a separator in communication with a lower end of the down pipe;
recycling the separated gas and liquid, comprising the steps of:
storing the compressed gas in a gas storage area;
storing the liquid separated from the compressed gas in a reservoir;
introducing the compressed gas from the gas storage area and the liquid from the reservoir into a gas-liquid pump;
pumping the liquid to the body of liquid; and
delivering at least some of the gas to the gas injection apparatus.

18. The method of claim 17, further comprising rotating blades of a turbine by contacting the turbine with the liquid that passes through the down pipe to generate electricity.

19. The method of claim 17, further comprising the steps of
providing a second body of liquid;
providing a second down pipe in fluid communication with the second body of liquid;
introducing the separated gas from the gas storage area and the liquid that passes through the second down pipe into a second gas-liquid pump; and
pumping the second liquid to the second body of liquid.

20. The method of claim 19, further comprising rotating a second turbine by contacting the second turbine with the second liquid that passes through the second down pipe to generate electricity.

* * * * *